(12) United States Patent
Andreasch et al.

(10) Patent No.: US 8,084,708 B2
(45) Date of Patent: Dec. 27, 2011

(54) REMOTE PROCESSING OF WORKPIECES

(75) Inventors: Wolfgang Andreasch, Weinstadt (DE); Armin Horn, Renningen (DE); Peter Kaupp, Sindelfingen (DE)

(73) Assignee: Trumpf Laser-und Systemtechnik GmbH, Ditzingen (DE)

( * ) Notice: Subject to any disclaimer, the term of this patent is extended or adjusted under 35 U.S.C. 154(b) by 1128 days.

(21) Appl. No.: 11/363,544

(22) Filed: Feb. 24, 2006

(65) Prior Publication Data
US 2006/0180582 A1 Aug. 17, 2006

Related U.S. Application Data

(63) Continuation of application No. PCT/EP2004/009564, filed on Aug. 27, 2004.

(30) Foreign Application Priority Data

Aug. 29, 2003 (EP) .................................. 03019721

(51) Int. Cl.
*B23K 26/02* (2006.01)
*B23K 26/04* (2006.01)

(52) U.S. Cl. ............... 219/121.62; 219/121.83; 700/166; 700/174; 702/182

(58) Field of Classification Search .. 219/121.6–121.72, 219/121.78, 121.81–121.83; 700/186, 245, 700/264, 174–177; 702/182–185; 148/565
See application file for complete search history.

(56) References Cited

U.S. PATENT DOCUMENTS

| | | | |
|---|---|---|---|
| 4,608,651 A * | 8/1986 | Murakami et al. ............ 700/250 |
| 4,825,394 A * | 4/1989 | Beamish et al. ............... 356/147 |
| 5,153,409 A * | 10/1992 | Rudaitis et al. .......... 219/121.83 |
| 5,233,191 A * | 8/1993 | Noguchi et al. ................... 850/1 |
| 5,380,978 A | 1/1995 | Pryor |
| 5,399,870 A * | 3/1995 | Torii et al. ................ 250/559.29 |
| 5,666,577 A * | 9/1997 | McIntyre et al. ............. 396/296 |
| 5,727,433 A * | 3/1998 | Pomerleau et al. ............... 83/29 |
| 6,091,074 A * | 7/2000 | Korevaar ................... 250/559.3 |

(Continued)

FOREIGN PATENT DOCUMENTS

JP 3010125 B2 2/1991

(Continued)

OTHER PUBLICATIONS

Office Action from European Patent Application No. 03 019 721.4-1262, mailed Feb. 28, 2006, 4 pages.
Office Action from European Patent Application No. 03 019 721.4-1262, mailed Sep. 20, 2007, 4 pages.
Translation in part of the Office Actions from the European Patent Office for European Patent Application No. 03 019 721.4-1262, mailed Feb. 28, 2006, and Sep. 20, 2007, 3 pages.

(Continued)

*Primary Examiner* — Samuel M Heinrich
(74) *Attorney, Agent, or Firm* — Fish & Richardson P.C.

(57) ABSTRACT

Systems and related methods of programming a laser processing device for automated processing of a workpiece including indicating a processing location on a workpiece with a processing location indicator. The processing location is detected with a processing location detector. The scanner optics of the laser processing device are adjusted to a set position corresponding to the detected processing location. A set position of the scanner optics is detected with a processing location evaluator, and a control program corresponding to the detected set position of the scanner optics is generated with the processing location evaluator.

12 Claims, 1 Drawing Sheet

U.S. PATENT DOCUMENTS

| | | | |
|---|---|---|---|
| 6,218,802 B1 * | 4/2001 | Onoue et al. | 318/568.13 |
| 6,536,553 B1 * | 3/2003 | Scanlon | 181/108 |
| 7,015,418 B2 * | 3/2006 | Cahill et al. | 219/121.69 |
| 2002/0038792 A1 * | 4/2002 | Terada et al. | 219/121.6 |
| 2002/0162973 A1 | 11/2002 | Cordingley et al. | |
| 2003/0173340 A1 * | 9/2003 | Mukae et al. | 219/121.6 |
| 2004/0252102 A1 * | 12/2004 | Wilson et al. | 345/156 |
| 2006/0050052 A1 * | 3/2006 | Mekenkamp et al. | 345/156 |

FOREIGN PATENT DOCUMENTS

| | | | |
|---|---|---|---|
| JP | 5034149 A | | 2/1993 |
| JP | 408300178 A | * | 11/1996 |
| JP | 9225659 A | | 9/1997 |
| JP | 10240332 A | | 9/1998 |
| JP | 10328864 A | | 12/1998 |
| JP | 11156578 | | 6/1999 |
| JP | 2002137081 A | | 5/2002 |

OTHER PUBLICATIONS

Manfred Weck, "Wekzeugmaschinen Fertigungssyteme 4: Automatisierung von Maschinen und Anlagen", Springer-Verlag Berlin Heidelberg, 2001, pp. 293-305.

Office Action from corresponding Japanese Patent Application No. 2006-524333, issued Mar. 30, 2011, 6 pages.

Translation of the Notification of Reasons for Refusal from corresponding Japanese Patent Application No. 2006-524333, dated Sep. 24, 2010, 9 pages.

* cited by examiner

REMOTE PROCESSING OF WORKPIECES

REFERENCE TO RELATED APPLICATIONS

This application is a continuation of PCT application PCT/EP2004/009564, filed Aug. 27, 2004 and designating the United States, and claims priority under 35 USC §119(a) from European patent application EP 03 019 721.4, filed Aug. 29, 2003. The complete disclosures of both priority applications are incorporated herein by reference.

TECHNICAL FIELD

This disclosure relates to remote processing of workpieces using a programmable laser processor.

BACKGROUND

Programmable laser processors, e.g., for laser welding of or laser writing onto workpieces, are known in the art. Laser processors of this type can include movable scanner mirrors which can be adjusted via a CNC-controlled operating device to direct a laser processing beam onto a respective processing location on the workpiece. The laser processing beam can be focused with a comparatively large focal length, and, as a result, the distance between the scanner optics and the workpiece to be processed can be correspondingly large.

Known methods of programming laser processors, e.g., for the remote processing of workpieces, include guiding a directional laser beam into a desired processing location through adjustment of the scanner optics, e.g., using a joystick or keyboard, before the workpiece is actually processed. A set value of a CNC control for an operating device of the scanner optics, which corresponds to the desired processing location or course of the directional laser beam, is stored in the CNC control. This stored value can be used for subsequent workpiece processing with the laser processing beam.

SUMMARY

According to one aspect, a programmable laser processing system includes a numerically controlled optics driver; scanner optics drivably connected to the optics driver and configured to direct a laser processing beam onto a workpiece; a processing location indicator operable to indicate a desired processing location on the workpiece; a processing location detector configured to detect a processing location from the desired processing location; an optics driver controller in electrical communication with the optics driver and configured to adjust the scanner optics, through the optics driver, to focus on the detected processing location; and a processing location evaluator configured to generate a control program based on the detected processing location in response to receiving a switching signal from the processing location indicator, and to deliver the control program to the optics driver controller for subsequent processing.

In some embodiments, the laser processing system can include a manual switch, disposed electrically between the processing location evaluator and the processing location indicator, configured to trigger delivery of the switching signal from the processing location indicator to the processing location evaluator when actuated. The manual switch can be disposed on the processing location indicator.

In some cases, the processing location indicator includes a light pointer configured to indicate the processing location with a light mark.

In some implementations, the processing location indicator is configured to indicate the processing location with a light mark visible on the surface of the workpiece.

In some examples, the processing location indicator includes a tactile indicator configured to indicate the processing location through physical contact with the workpiece.

In some instances, the process location detector includes an optical detection device.

In some embodiments, an optical axis of the optical detection device coincides with a beam axis of the laser processing beam.

According to another aspect, a method of programming a laser processing device for automated processing of a workpiece includes indicating a processing location on a workpiece with a processing location indicator. The processing location is detected with a processing location detector. The scanner optics of the laser processing device are adjusted to a set position corresponding to the detected processing location. The set position of the scanner optics is detected with a processing location evaluator, and a control program corresponding to the detected set position of the scanner optics is generated with the processing location evaluator.

In some cases, the set position can be stored in an optics controller. During subsequent workpiece processing, the scanner optics can be positioned using the stored set position, such that it directs the laser processing beam onto the processing location that was previously indicated with the processing location indicator.

In some embodiments, indicating the processing location includes manually guiding the processing location indicator over a surface of the workpiece.

The processing location indicator can be pointers of different construction, for example, in some embodiments, the processing location indicator includes a manually guided tactile pointer. In this case, indicating the processing location includes physically contacting the workpiece with the tactile pointer at a position on a surface of the workpiece corresponding to the processing location. Tactile pointers can provide easy handling and particular accuracy for marking (i.e., identifying) processing locations. In some embodiments, the processing location indicator includes a light pointer. In this case, indicating the processing location includes projecting a light mark onto the surface of the workpiece with the light pointer. A light pointer can be particularly helpful in situations where contact with the workpiece is not possible, e.g., due to inaccessibility of the relevant processing location, or if contact with the workpiece is not possible for other reasons.

In some implementations, the method includes directing the laser processing beam onto the processing location using the control program. In some cases, directing the laser processing beam onto the processing location includes laser welding or laser writing on the workpiece.

In some embodiments, a location of the processing location indicator is continuously detected and is therefore also detected if no processing location is indicated.

In some cases, generating the control program includes actuating the processing location evaluator. The processing location evaluator can be in a state of constant readiness where only one triggering (i.e., actuating) step is required to define the set position for the scanner optics. In some cases, indicating the processing location can include indicating a weld path including manually guiding the processing location indicator over a surface of the workpiece in a course corresponding to the weld path with the processing location evaluator actuated. Actuating the processing location evaluator can include triggering delivery of a switching signal from the processing location indicator to the processing location evaluator. The switching signal can be triggered with a manual switch, which, for example, can be disposed on the indicator. The generated switching signal may be of different kinds. Electric or acoustic switching signals are feasible as well as optical switching signals.

In some embodiments, the processing location detector includes an optical detection device. In this case, the processing location can be detected, e.g., with image processing.

In some embodiments, the scanner optics include mirrors and the optical detection device detects the processing location from an image reflected through the mirrors. In some cases, an optical axis of the optical detection device coincides with a beam axis of a laser processing beam of the laser processing device. In some cases, adjusting the scanner optics of the laser processing device can include automatically adjusting the scanner mirrors such that the desired processing location is maintained substantially centered in the image.

In some implementations, the scanner optics assume a double function. On the one hand, the scanner optics can guide the laser processing beam to the processing location on the workpiece during workpiece processing, and on the other hand, the scanner optics can form a component of the device for programming the control of its own operating device.

According to yet another aspect, a laser processor programming system includes a processing location indicator, a processing location detector, an optics controller, and a processing location evaluator. The processing location indicator is operable to indicate a processing location on a workpiece. The processing location detector is configured to detect the processing location through scanner optics of the laser processor. The optics controller is configured to the adjust the scanner optics to a set position coinciding with the detected processing location, and the processing location evaluator is configured to detect the set position of the scanner optics, and, in response, generate a control program for subsequent processing of the workpiece.

In some embodiments, the processing location indicator includes a manually engageable switch configured to actuate the processing location evaluator, thereby detecting the set position of the scanner optics and generating the control program.

In some cases, the processing location detector includes an optical detection device, e.g., a position sensitive detector, a charge-coupled device camera, and/or a four quadrant diode.

In some implementations, the optics controller can include memory configured to store the control program for subsequent processing of additional workpieces.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
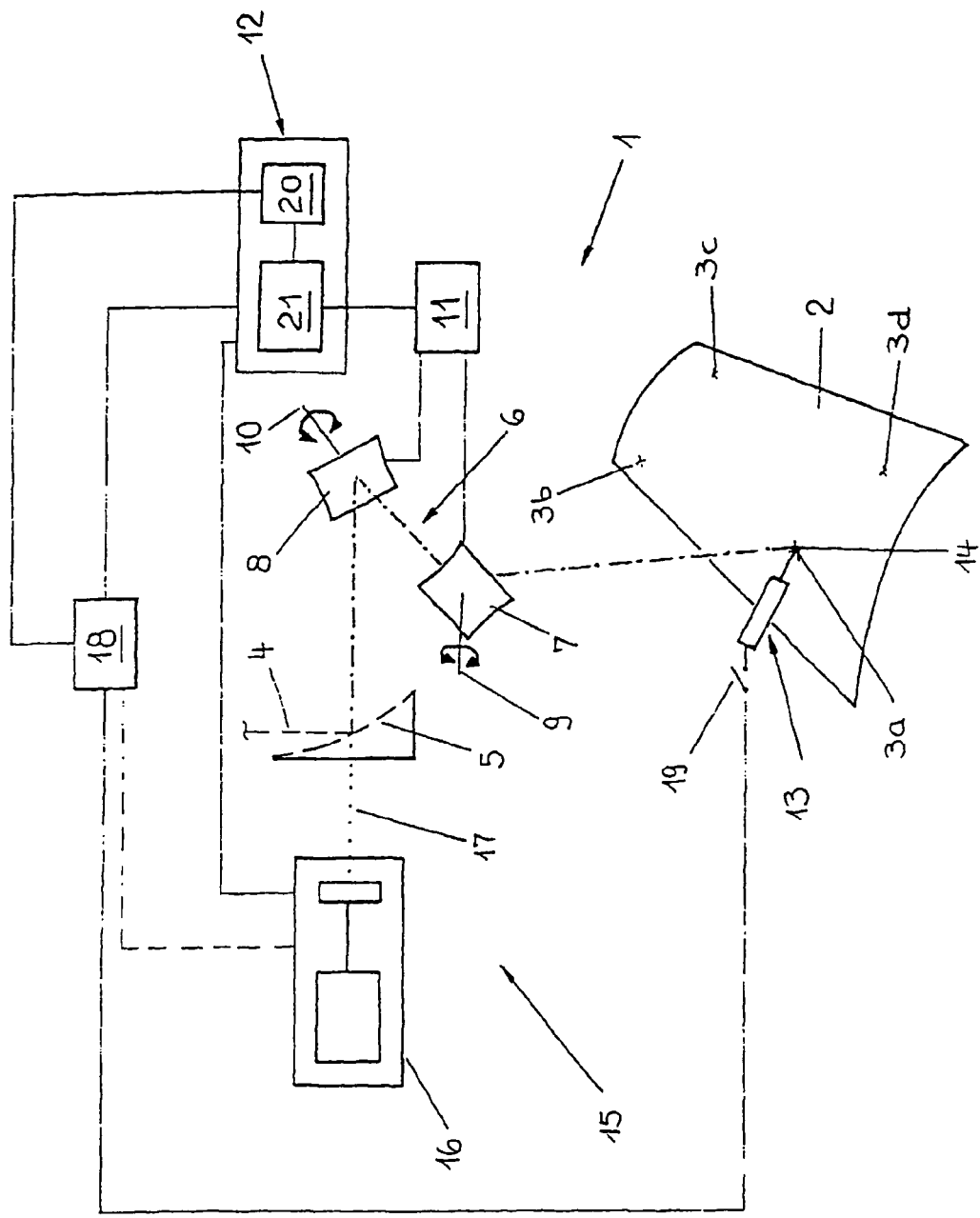
FIG. 1 is a schematic representation of a programmable laser processing system.

FIG. 1 shows a device 1 for remote welding ("scanner welding") of workpieces, in the present case, an example of a three-dimensional workpiece 2. Four welding points at the processing locations 3a, 3b, 3c, 3d, are to be created on the workpiece 2.

The workpiece 2 is processed using a laser processing beam 4 whose beam axis is shown in a dashed line. The laser processing beam 4 is generated in a $CO_2$ laser (not shown) and is guided via a semireflecting mirror 5 and scanner optics 6 to the workpiece 2 for workpiece processing. Other laser constructions, e.g. YAG lasers, may also be used to generate a laser beam. A perforated mirror would also be feasible instead of the semireflecting mirror 5. The scanner optics 6 are shown as two scanner mirrors 7, 8. They can be moved about adjustment axes 9, 10 and can be adjusted thereby. The scanner mirrors 7, 8 or the scanner optics 6 are adjusted using an electromotive operating device (e.g., numerically controlled optics driver) 11 which comprises an optics driver controller (i.e., numerical control) 12.

The optics driver controller 12 of the optics driver 11 can be programmed by a teaching system before the workpiece 2 is processed with the laser processing beam 4.

Part of this teaching system includes a marking device (i.e., processing location indicator) in the form of a manually guided tactile pointer 13 ("teach pointer") including a pointer mark formed by a pointer tip 14.

A processing location detection system 15 for detecting the indicator tip 14 is also part of the teaching system. The detection system 15 includes a CCD camera 16 and, as further components, the semi-reflecting mirror 5 and the scanner optics 6. As an alternative to the CCD camera 16, e.g., a four quadrant diode or a PSD (position sensitive detector) could be used.

An optical axis 17 of the detection system 15 is shown in a dotted line. The beam axis of the laser processing beam 4 and the optical axis 17 of the detection system 15 coincide between the semi-reflecting mirror 5 and the scanner optics 6, and between the scanner optics 6 and the workpiece 2. This fact is shown by the dash-dotted line between the semi-reflecting mirror 5 and the pointer tip 14. The pointer tip 14 is in close proximity in the processing location 3a.

A processing location evaluator 18 is connected to the pointer 13 and also to the optics driver controller 12 of the optics driver 11. The connection between the processing location evaluator 18 and the pointer 13 can be switched using a switch 19. The processing location evaluator 18 is also part of the teaching system for the optics driver controller 12.

For programming the optics driver controller 12 of the operating device 11, the operator manually guides the pointer 13 along a surface of the workpiece 2. The operator disposes the pointer tip 14 of the pointer 13 on the workpiece 2 at the processing points 3a, 3b, 3c, 3d where the welding points shall be produced. The pointer tip 14 is observed with the CCD camera 16 via the scanner mirrors 7, 8 of the scanner optics 6 during motion of the pointer 13 between the processing locations 3a, 3b, 3c, 3d. The tip is detected using image processing. The scanner mirrors 7, 8 are automatically adjusted such that the pointer tip 14 is maintained substantially centered in the image by suitable driving of the optics driver controller 12 of the operating device 11.

With application of the pointer tip 14 to the processing locations 3a, 3b, 3c, 3d, the operator actuates the switch 19 each time. The electrical switching signal generated thereby activates the processing location evaluator 18 which subsequently detects a set value of the optics driver controller 12 for the operating device 11, which effects adjustment of the scanner optics 6 at the time of activation of the processing location evaluator 18. In this manner, the processing location evaluator 18 subsequently defines four set values for the optics driver controller 12 of which each one is associated with one of the processing locations 3a, 3b, 3c, 3d. These set values are stored in a memory 20 of the optics driver controller 12 from which they can be retrieved by a control computer 21 during subsequent processing of the workpiece 2 for setting the scanner optics 6. A coherent welding path can be programmed by moving the pointer 13 over the workpiece 2 with permanently closed switch 19.

As an alternative to the situation as shown, the processing location evaluator 18 may also be activated using an optical switching signal. This switching signal may be generated, e.g., using a switchable light emitting diode on the pointer tip 14. It can be detected by the detection system 15. The optical activation of the processing location evaluator 18 is shown in FIG. 1 by the dashed line between the CCD camera 16 and the evaluation means 18.

For subsequent processing of the workpiece 2, the optics driver controller 12 of the operating device 11 is coupled to the laser control via a connection (not shown). The laser processing beam 4 is directed onto the workpiece 2 every time the scanner optics 6 is adjusted such that the laser beam 4 impinges the workpiece 2 at the relevant processing location 3a, 3b, 3c, 3d.

A number of embodiments of the invention have been described. Nevertheless, it will be understood that various modifications may be made without departing from the spirit and scope of the invention. Accordingly, other embodiments are within the scope of the following claims.

What is claimed is:

1. A programmable laser processing system for automated processing of workpieces, the laser processing system comprising:
    a numerically controlled optics driver;
    scanner optics comprising one or more scanner mirrors drivably connected to the optics driver and configured to direct a laser processing beam onto a workpiece;
    a processing location indicator operable to generate a switching signal when the processing location indicator has reached a processing location on the workpiece;
    an optical detection device configured to detect the processing location through the scanner optics;
    an optics driver controller in electrical communication with the optics driver and configured to adjust the scanner optics, through the optics driver, to focus on the detected processing location; and
    a processing location evaluator configured to generate a control program based on the detected processing location in response to receiving the switching signal from the processing location indicator, and to deliver the control program to the optics driver controller to position the scanner optics for subsequent processing of the workpiece by the laser processing beam,
    wherein the processing location indicator is manually displaceable independently of the scanner optics to indicate the processing location,
    wherein the scanner optics assume a dual function in which (i) during programming of the processing system, the scanner mirrors of the scanner optics operate to guide an image of the processing location from the workpiece to the optical detection device for use in detecting the processing location, and (ii) during workpiece processing, the scanner mirrors operate to guide the laser beam to the processing location.

2. The laser processing system according to claim 1, further comprising a manual switch disposed electrically between the processing location evaluator and the processing location indicator and configured to trigger delivery of the switching signal from the processing location indicator to the processing location evaluator when actuated.

3. The laser processing system according to claim 2, wherein the manual switch is disposed on the processing location indicator.

4. The laser processing system according to claim 1, wherein the processing location indicator comprises a light pointer configured to indicate the processing location with a light mark.

5. The laser processing system according to claim 1, wherein the processing location indicator is configured to indicate the processing location with a light mark visible on the surface of the workpiece.

6. The laser processing system according to claim 1, wherein the processing location indicator comprises a tactile indicator configured to indicate the processing location through physical contact with the workpiece.

7. The laser processing system according to claim 1, wherein an optical axis of the optical detection device coincides with a beam axis of the laser processing beam.

8. The laser processing system according to claim 1, wherein, during programming of the processing system, the optics driver controller automatically adjusts the scanner mirrors such that the processing location is maintained substantially centered in the image.

9. A laser processor programming system that operates in conjunction with scanner optics and a laser beam for automated processing of workpieces, the programming system comprising:
    a processing location indicator operable to indicate a processing location on a workpiece;
    an optical detection device configured to detect a processing location through scanner optics;
    an optics driver controller configured to the adjust the scanner optics to a set position coinciding with the detected processing location; and
    a processing location evaluator configured to detect the set position of the scanner optics, and, in response, generate a control program for subsequent processing of the workpiece,
    wherein the processing location indicator is manually displaceable independently of the scanner optics to indicate the processing location, and
    wherein the optics driver controller adjusts the scanner optics to assume a dual function in which (i) the optics driver controller adjusts scanner mirrors of the scanner optics to guide an image of the processing location from the workpiece to the optical detection device to detect the processing location, and (ii) during workpiece processing, the optics driver controller uses the control program to adjust the scanner mirrors to guide the laser beam to the processing location.

10. The laser processor programming system according to claim 9, wherein the processing location indicator comprises a manually engageable switch configured to actuate the processing location evaluator, thereby detecting the set position of the scanner optics and generating the control program.

11. The laser processor programming-system according to claim 9, wherein the optical detection device is selected from the group consisting of a position sensitive detector, a charge-coupled device camera, and a four quadrant diode.

12. The laser processor programming system according to claim 9, wherein the optics controller comprises memory configured to store the control program for subsequent processing of additional workpieces.

* * * * *